United States Patent [19]

Cronauer et al.

[11] 4,080,282

[45] Mar. 21, 1978

[54] CATALYTIC REACTOR AND PROCESS FOR HYDROGENATING SOLID-CONTAINING CARBONACEOUS MATERIALS IN SAID REACTOR

[75] Inventors: Donald C. Cronauer; Harold E. Swift, both of Gibsonia, Pa.

[73] Assignee: Gulf Research & Development Company, Pittsburgh, Pa.

[21] Appl. No.: 704,352

[22] Filed: Jul. 12, 1976

[51] Int. Cl.$^2$ .............................................. C10G 1/08
[52] U.S. Cl. ..................................... 208/10; 208/143; 252/477 R; 23/288 R
[58] Field of Search ........................... 208/9, 10, 143; 23/288 R; 252/477 R

[56] References Cited

U.S. PATENT DOCUMENTS

| | | | |
|---|---|---|---|
| 1,934,023 | 11/1933 | Wright | 208/10 |
| 2,709,128 | 5/1955 | Krause | 23/288 R |
| 2,730,434 | 1/1956 | Howdry | 252/477 R |
| 3,840,456 | 10/1974 | Yavorsky et al. | 208/10 |
| 3,997,426 | 12/1976 | Montagna et al. | 208/10 |

*Primary Examiner*—Delbert E. Gantz
*Assistant Examiner*—James W. Hellwege

[57] ABSTRACT

A novel catalytic reactor comprising an elongated reaction chamber and catalytic elements composed of alumina and a hydrogenation catalyst vertically disposed within the reaction chamber and a coal hydrogenation process using such reactor.

6 Claims, 2 Drawing Figures

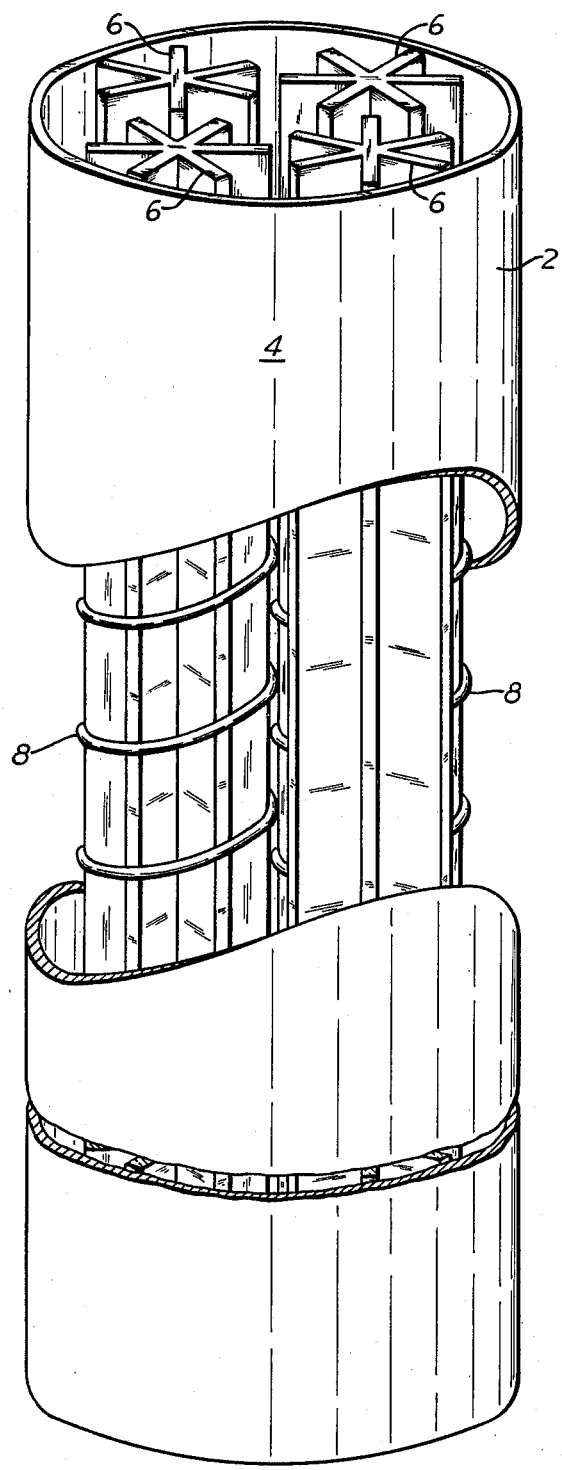
Fig. I
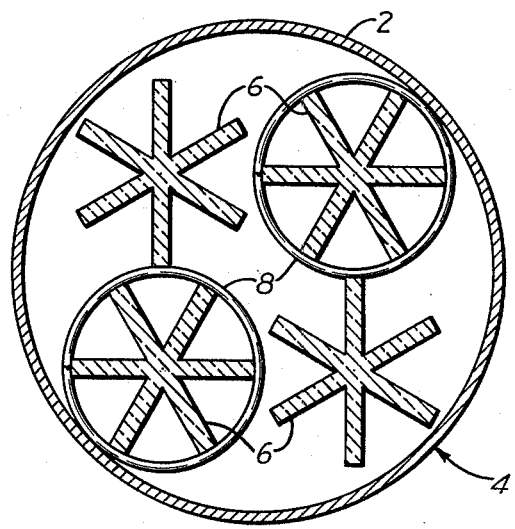
Fig. II

CATALYTIC REACTOR AND PROCESS FOR HYDROGENATING SOLID-CONTAINING CARBONACEOUS MATERIALS IN SAID REACTOR

BACKGROUND OF THE INVENTION

1. Field of the Invention

This invention relates to a novel catalytic reaction chamber and catalytic elements composed of alumina and a hydrogenation catalyst vertically disposed within the reaction chamber and a hydrogenation process using such reactor.

2. Description of the Prior Art

Hydrogenation of a feed stream containing solid components such as a coal slurry, by passing the same through a bed of hydrogenation catalyst will present serious problems, for in a relatively short time the catalyst bed will become plugged with said solid components, reaction decomposition and degradation products, etc., and the operation will terminate and cannot be continued until the catalyst has been cleaned, regenerated or replaced with fresh catalyst. In U.S. Pat. No. 1,934,023 to Wright an attempt was made to minimize or avoid such problems but the catalytic elements used were either made of elements, such as metal, having a low surface area and therefore of low catalytic quality, or of a base material carrying a catalytic coating, which would easily be removed from the surface of the base in use.

SUMMARY OF THE INVENTION

We have found that the above difficulties can be avoided and hydrogenation of said defined streams can be carried out over a long period of time by carrying out said hydrogenation reactions in our novel catalytic reactor which comprises an elongated vertical reaction vessel and elongated catalytic elements vertically disposed within the reactor vessel, said catalytic elements being composed of alumina and a hydrogenation catalyst.

The invention defined and claimed herein can be better understood by reference to the drawings wherein FIG. I is a schematic view in elevation of the novel reactor, with portions of the reaction chamber wall cut away to show internal structure and FIG. II is a cross-section of the reactor at an intermediate level thereof looking down into the internal structure.

In the drawings, reference numeral 2 defines the wall of the reactor 4, which can be made of any suitable metal, such as, for example, stainless steel. Reference numeral 6 defines catalytic elements vertically disposed within reactor 4 but spacially separated from one another. In order to maintain such spacial separation any suitable means can be used. In the drawings such separation is maintained by wrapping a spiral wire 8 around one or more of said catalytic elements. The catalytic elements can be maintained in vertical position in any suitable manner. For example this can be done by attaching the end portions thereof to a horizontal member which, in turn, is attached to reactor wall 4 or they can be attached at their ends to the base and to head of the reactor, respectively, neither of which is shown, etc.

The composition of the catalytic elements, their spacial arrangement within the reactor and the void volume within the reactor are critical in order for the same to function effectively as a hydrogenation reactor. The catalytic elements are composed of alumina ($Al_2O_3$) and a hydrogenation catalyst. The pore size of the alumina is such that at least about 60 volume percent of the pore diameters fall in the range of about 160 to about 600 A, preferably about 200 to about 600 A, the surface area is in the range of about 70 to about 150 square meters per gram, preferably about 80 to about 125 square meters per gram, the pore volume is in the range of about 0.4 to about 0.8 cubic centimeters per gram, preferably about 0.45 to about 0.70 cubic centimeters per gram and the average pore diameter from about 100 to about 275, preferably about 175 to about 250 A.

Any hydrogenation catalyst well-known to those having ordinary skill in the art can be employed herein, but preferably the catalyst which is employed comprises at least one hydrogenating component selected from the group consisting of the metals, metal sulfides and/or metal oxides of (a) a combination of about 2 to about 25 percent (preferably about 4 to about 16 percent) by weight molybdenum and at least two iron-group metals or an iron-group metal and titanium wherein the iron-group metals and titanium are present in such amounts that the atomic ratio of each iron-group metal or titanium with respect to molybdenum is less than about 0.4 and (b) a combination of about 5 to about 40 percent (preferably about 10 to about 25 percent) by weight of nickel and tungsten where the atomic ratio of tungsten to nickel is about 1:0.1 to 5 (preferably about 1:0.3 to about 4). Particularly preferred among the hydrogenating metals are nickel, cobalt, titanium, molybdenum and tungsten. Catalysts of type "(a)" may contain molybdenum in the amounts conventionally used, i.e., about 2 to about 25 percent molybdenum based on the total weight of the catalyst including the porous carrier. Smaller amounts of molybdenum than about 2 percent may be used, but this reduces the activity. Larger amounts than about 25 percent can also be used but do not increase the activity and constitute an extra expense. We prefer to utilize a catalyst containing about 4 to about 16 percent by weight molybdenum, most preferably about 10 percent; about 2 to about 10 percent by weight nickel, most preferably about 2 percent; and about 1 to about 5 percent by weight cobalt, most preferably about 1.5 percent. Another preferred catalyst contains about four to about 16 percent by weight molybdenum, preferably about 6 to about 12 percent be weight molybdenum; about 1 to about 8 percent by weight nickel, preferably about 2 to about 6 percent by weight nickel; and about one to about 10 percent by weight titanium, preferably about 2 to about 6 percent by weight titanium. While a three-metal component catalyst as in "(a)" is preferred, we can also use a two metal component catalyst as in "(b)". When using a two-metal component catalyst, we prefer to utilize one containing about 15 to about 25 percent (e.g., about 19 percent) tungsten and about 2 to about 10 percent (e.g., about 6 percent) nickel supported on a porous carrier such as alumina. In a two-metal component catalyst, the weight ratio of tungsten to nickel is preferably in the range of about 2:1 to about 4:1 tungsten to nickel, repectively. The amounts of the iron group metals or titanium above may be varied as long as the above proportions are used. However, in "(a)" we prefer to utilize one iron group metal or titanium in an atomic ratio between about 0.1 and about 0.2 and to use the other iron group metal or metals in an atomic ratio of iron group metal or titanium to molybdenum of less than about 0.1 and especially between about 0.05 and about 0.1.

The catalytic elements composed of the alumina and the hydrogenation catalyst defined above are such that the alumina and the catalyst are substantially distributed throughout said alumina, that is throughout its bulk. The preparation of the catalytic elements forms no part of the invention herein and can be fabricated in any suitable or conventional manner. For example, the alumina and the catalytic metal can be intimately mixed together to form a substantially homogeneous mixture and the resulting mixture can then be extruded, cast, molded or otherwise formed into any desirable shape. Alternatively, the alumina can be formed into the desirable shape and then impregnated with a solution of salts of the above metals to distribute the solution throughout its bulk, after which the impregnated member is calcined, all in accordance with known procedures. The amount of hydrogenating component, based on the metal itself, present in the final catalytic element can vary over a wide range, but in general will range from about 0.5 to about 60 percent by weight, preferably will range from about two to about 30 percent by weight.

In order to render the catalytic element effective as a hydrogenation catalyst throughout its bulk, it is imperative that its thickness be in the range of about 1/32 to about ½ inch (about 0.8 to about 12.7 millimeters), preferably about 1/16 to about ¼ inch (about 1.6 to about 6.4 millimeters). By "thickness" we mean the measurement taken along the line extending from any interior point of the catalytic element to the nearest adjacent outer surface. Equally critical in order to effect substantially unhindered movement of liquid, solid particles and gas bubbles (for example, hydrogen) through the reactor is the distance that must be maintained throughout the reactor between adjacent catalytic elements and between said elements and an adjacent interior wall of the reactor. The distance between the surface of one catalytic element to another or to the interior wall of the reactor vessel must be at least about 1/32 inch (about 0.08 millimeter), preferably about ⅛ to about 5 inches (about 3.2 to about 127 millimeters). Also critical in obtaining effective hydrogenation and facilitating movement of material through the reactor is the void volume. This must be from about 40 to about 90 percent, preferably from about 50 to about 80 percent. By void volume we mean the volume of the empty reactor minus the total volume of the catalyst elements divided by the volume of the empty reactor multiplied by 100.

In the drawings, the catalytic elements have been shown to be of asterick design in cross section, but it is understood that they can be of any design, star-shaped, circular, etc., as long as the above critical dimensions are observed.

Any feed stream requiring hydrogenation can be used in the catalytic reactor defined herein. In particular, a preferred feed for use in the catalytic reactor is a hydrocarbon feed containing solid components, such as, for example, solid carbonaceous materials having the following composition on a moisture-free basis:

|  | Weight Per Cent | |
|---|---|---|
|  | Broad Range | Normal Range |
| Carbon | 45–95 | 60–92 |
| Hydrogen | 2.5–7.0 | 4.0–6.0 |
| Oxygen | 2.0–45 | 3.0–25 |
| Nitrogen | 0.75–2.5 | 0.75–2.5 |
| Sulfur | 0.3–10 | 0.5–6.0 |

The carbon and hydrogen content of the carbonaceous material will reside primarily in benzene compounds, multi-ring aromatic compounds, heterocyclic compounds, etc. Oxygen and nitrogen are believed to be present primarily in chemical combination with the aromatic compounds. Some of the sulfur is believed to be present in chemical combination with the aromatic compounds and some in chemical combination with inorganic elements associated therewith, for example, iron and calcium.

In addition to the above, the solid carbonaceous material being treated herein may also contain solid, primarily inorganic, compounds which will not be convertible to liquid product herein, which are termed as "ash", and are composed chiefly of compounds of silicon, aluminum, iron and calcium, with smaller amounts of compounds of magnesium, titanium, sodium and potassium. The ash content of a carbonaceous material treated herein can be, for example, less than 50 weight percent, based on the weight of the moisture-free carbonaceous material, but in general will amount to about 0.1 to about 30 weight percent, usually about 0.5 to about 20 weight percent.

Anthracitic, bituminous and subbituminous coal, lignitic materials, and other types of coal products referred to in ASTM D-388 are exemplary of the solid carbonaceous materials which can be treated in accordance with the process of the present invention to produce upgraded products therefrom. When a raw coal is employed in the process of the invention, most efficient results are obtained when the coal has a dry fixed carbon content which does not exceed 86 percent and a dry volatile matter content of at least 14 percent by weight as determined on an ash-free basis. The coal, prior to use in the process of the invention, is preferably ground in a suitable attrition machine, such as a hammermill, to a size such that at least 50 percent of the coal will pass through a 40-mesh (U.S. Series) sieve. The ground coal is then dissolved or slurried in a suitable solvent. If desired, the solid carbonaceous material can be treated, prior to reaction herein, using any conventional means known in the art, to remove therefrom any materials forming a part thereof that will not be converted to liquid herein under the conditions of reaction.

Any liquid compound, or mixtures of such compounds, having hydrogen transfer properties can be used as solvent herein. However, liquid aromatic hydrocarbons are preferred. By "hydrogen transfer properties", we mean that such compound can, under the conditions of reaction herein absorb or otherwise take on hydrogen and also release the same. A solvent found particularly useful as a startup solvent is anthracene oil defined in Chamber's Technical Dictionary, MacMillan, Great Britain 1943, page 40, as follows: "A coal-tar fraction boiling above 518° 1 F, consisting an anthracene, phenanthrene, chrysene, carbazole and other hydrocarbon oils." Other solvents which can be satisfactorily employed are those which are commonly used in the Pott-Broche process. Examples of these are polynuclear aromatic hydrocarbons such as naphthalene and chrysene and their hydrogenated products such as tetralin (tetrahydronaphthalene), decalin, etc. or one or more of the foregoing in admixture with a phenolic compound such as phenol or cresol.

The selection of a specific solvent when the process of the present invention is initiated is not critical since a liquid fraction which is obtained during the defined conversion process serves as a particularly good solvent for the solid carbonaceous material. The liquid fraction which is useful as a solvent for the solid carbonaceous material, particularly coal, and which is formed during the process, is produced in a quantity which is more than sufficient to replace any solvent that is converted to other products or which is lost during the process. Thus, a portion of the liquid product which is formed in the process of the invention is advantageously recycled to the beginning of the process. It will be recognized that as the process continues, the solvent used initially becomes increasingly diluted with recycle solvent until the solvent used initially is no longer distinguishable from the recycle solvent. If the process is operated on a semicontinuous basis, the solvent which is employed at the beginning of each new period may be that which has been obtained from a previous operation. For example, liquids produced from coal in accordance with the present invention are aromatic and generally have a boiling range of about 300° to about 1400° F., a density of about 0.9 to about 1.1 and a carbon to hydrogen mol ratio in the range of about 1.3:1 to about 0.66:1. A solvent oil obtained from a subbituminous coal, such as Wyoming-Montana coal, comprises a middle oil having a typical boiling range of about 375° to about 675° F. Thus, the solvent that is employed herein can broadly be defined as that obtained from a previous conversion of a carbonaceous solid material in accordance with the process defined herein. Although we have used the term "solvent", it is understood that such term covers the liquid wherein the liquid product obtained herein is dissolved as well as the liquid in which the solid materials are dispersed.

The ratio of solvent to solid carbonaceous material can be varied so long as a sufficient amount of solvent is employed to effect dissolution of substantially all of the solid carbonaceous material in the reaction vessel. While the weight ratio of solvent to solid carbonaceous material can be within the range of about 0.6:1 to about 4:1, a range of about 1:1 to about 3:1 is preferred. Best results are obtained when the weight ratio of solvent to solid carbonaceous material is about 2:1. Ratios of solvent to solid carbonaceous material greater than about 4:1 can be used but provide little significant functional advantage in dissolving or slurrying the solid carbonaceous material for use in the process of this invention. An excessive amount of solvent is undesirable in that added energy or work is required for subsequent separation of the solvent from the system.

In accordance with the present invention, the slurry and hydrogen are passed into reactor 4, for example, upwardly, and are maintained therein at a temperature between about 500° and about 900° F., (about 260° to about 482° C.) preferably about 650° to about 875° F. (about 343° to about 468° C.) and at a pressure between about 500 and about 10,000 pounds per square inch gauge (psig) (about 35 to about 703 kilograms per square centimeter) and preferably at a pressure between about 1500 and about 4000 psig, (about 105 to about 281 kilograms per square centimeter) utilizing a weight hourly space velocity (WHSV) between about 0.25 and about 50 pounds of solid carbonaceous material per pound of catalyst per hour, and added hydrogen in amounts between about 2000 and about 20,000 standard cubic feet (SCF) per barrel of slurry. The exact conditions selected will depend, for example, upon the catalyst, the particular charge stock to be treated, and the degree of conversion desired. It is desirable to utilize as low a temperature as possible and still obtain the desired results. This is due to the fact that the degree of activation or promotion of some hydrogenation catalysts becomes more pronounced at the lower reaction temperatures. The hydrogen recycle rate does not vary significantly with various charge stocks and preferably should be between about 2000 and about 10,000 standard cubic feet per barrel of slurry.

The novel catalytic reactor herein can also be used for the conversion of solid-containing liquid hydrocarbon oils, particularly solid-containing liquid hydrocarbon oils derived from coal, oil shale and tar sands. By "liquid hydrocarbon oils" we mean to include the organic liquid hydrocarbons obtained from the physical and/or chemical treatment of coal, oil shale and tar sands.

Liquid hydrocarbon oils can contain solids that can interfere with subsequent processing thereof. These solids can be those which find their way into the liquid hydrocarbon oils during production thereof, while in storage or during processing. Solid-containing liquid hydrocarbon oils that are preferably treated herein are solid-containing liquid hydrocarbon oils derived from coal, oil shale and tar sands.

These liquid hydrocarbon oils are old and well-known and can be obtained in many ways. Reference, for example, for obtaining or producing these oils can be found in Kirk-Othmer Encyclopedia of Chemical Technology, Second Edition, 1969, John Wiley & Sons, Inc., New York, New York: Volume 5, pages 606 to 678, for liquid hydrocarbon oils derived from coal; Volume 18, pages 1 to 20, for liquid hydrocarbon oils derived from oil shale; and Volume 19, pages 682 to 732, for liquid hydrocarbon oils derived from tar sands.

While these liquid hydrocarbon oils vary greatly in their composition, in the main they are composed of mono and polynuclear aromatic compounds, some of which can include chemically combined sulfur, nitrogen and/or oxygen. In general, their approximate composition, on a moisture-free, solid-free basis, can be as follows:

|  | Weight Per Cent | |
|---|---|---|
|  | Broad Range | Normal Range |
| Carbon | 80–95 | 83–92 |
| Hydrogen | 5–15 | 5–13 |
| Nitrogen | 0.1– 4 | 0.1– 3 |
| Oxygen | 0.1– 4 | 0.1–2.5 |
| Sulfur | 0.1–10 | 0.1– 5 |

The solids that can be associated with the above-identified liquid hydrocarbon oils will contain in excess of about 50 weight percent of inorganic components, generally from about 60 to about 98 weight percent. Generally, these inorganic components will be, for example, iron compounds, such as ferric sulfide; silica-containing compounds, such as quartz, kaolin, mica, montmorillonite and zeolites; metal carbonates, such as calcite, dolomite and nahlcolite; etc. Based on the weight of the liquid hydrocarbon oil, the solids content thereof will be in the range of about 0.1 to about 20 weight percent, generally about 0.1 to about 5 weight percent.

The procedure defined herein can be used to improve the physical properties of the liquid hydrocarbon oil, for example, to reduce its gravity, pour point and/or viscosity and/or the chemical properties of the liquid hydrocarbon oil, for example, reduce its sulfur and/or nitrogen content.

When using these oils the process, in general, comprises passing a solid-containing liquid hydrocarbon oil, together with hydrogen, into the reaction vessel referred to and described more fully hereinabove. In the reactor, the solid-containing liquid hydrocarbon oil is contacted with hydrogen in the presence of a hydrogenation catalyst at a temperature between about 500° and about 900° F., (about 260° to about 482° C.), preferably about 650° to about 875° F. (about 343° to about 478° C.) and a pressure between about 500 and about 10,000 pounds per square inch gauge (psig), (about 35 to about 703 kilograms per square centimeter) and preferably at a pressure between about 1000 and 4000 psig, (about 105 to about 281 kilograms per square centimeter) utilizing a weight hourly space velocity (WHSV) between about 0.25 and about 50 pounds of liquid hydrocarbon oil per pound of catalyst per hour, and added hydrogen in amounts between about 2000 and about 20,000 standard cubic feet (SCF) per barrel of solid-containing liquid hydrocarbon oil. The exact conditions selected will depend upon the catalyst, the particular charge stock to be treated, and the degree of physical and/or chemical conversion desired, etc. It is desirable to utilize as low a temperature as possible and still obtain the desired results. This is due to the fact that the degree of activation or promotion of some hydrogenation catalysts becomes more pronounced at the lower reaction temperatures. The hydrogen recycle rate does not vary significantly with various charge stocks and preferably should be between about 2000 and about 10,000 standard cubic feet per barrel of solid-containing liquid hydrocarbon oil.

At the end of the reaction, the reaction product is removed from reactor 4, preferably from the top thereof, and can be subjected to further processing, for example, to remove solid components that may be therein and to separate the liquid components into any desired fractions. In a preferred procedure, the gases are separated from the reaction product and hydrogen recovered therefrom are recycled to the reactor. The remainder of the reaction product will then be sent to solids separation unit, for example, a continuous rotating filter, centrifuge, etc., if necessary, to separate solids therefrom, and the remaining product is the desired product. It is understood that in some cases the latter can be sent to a distillation unit wherein various cuts can be removed at a desired pressure, usually under vacuum for the recovery of specific distillation cuts.

The catalytic reactor defined and claimed herein provides unusual and unexpected results, particularly when the same is used to hydrogenate a liquid hydrocarbon feed containing solid components herein of the type described hereinabove. Thus, since the catalytic elements are vertically disposed within the reactor and critically spaced from one another and from the inner walls of the reactor, thus forming substantially unobstructed passageways through the reactor, there is little or no danger that the plugging will result. However, the liquid charge will still maintain contact with the catalytic components on the surface of the alumina of the catalytic elements and in the pores thereof, so that effective hydrogenation will continue to take place. Even if there may be some tendency to deposit solid material on the outer surface of the catalytic elements and in the pores of the alumina adjacent to the surface of the catalytic elements, the catalytic elements will tend to be self-cleaning or self-generating, since the abrasive action of the solids in the feed will continuously remove the surface portion of the catalytic elements and thereby present a clean catalytic surface. However, the amount of catalytic element so removed will be so slight that its life will not be materially shortened thereof. Because of these advantages, we can carry out a hydrogenation reaction in the novel catalytic reactor for a long period of time without regeneration and still obtain the desired hydrogenation product.

DESCRIPTION OF PREFERRED EMBODIMENTS

Catalyst elements were prepared as follows. Eight pieces of monoliths, asterick-shaped in cross-section, the same as disclosed in the drawing, composed of alumina were weighed together and found to be 682.49 grams in weight. Each monolith was 44 inches in length (112 centimeters) with each of the six fins being 1/16 inch thick (1.6 millimeter). The diameter of each monolith (the length of two longitudinally-aligned fins) was one inch (24.5 millimeters). The alumina in the monoliths was a gamma alumina having a surface area of 105.9 square meters per gram, a pore volume of 0.58 cubic centimeters per gram and an average pore diameter of 218.2 A.

A solution of ammonium molybdate was prepared by dissolving 744 grams of ammonium molybdate into a mixture of 325 cubic centimeters of concentrated ammonium hydroxide in water. The volume of the solution was 4164 milliliters. The monoliths were soaked in the solution for one hour at room temperature with gentle mixing until they had absorbed 414 cubic centimeters of solution, dried at 120° C. overnight and calcined at 538° C. overnight. The monoliths showed a gain of 55.07 grams.

The treated monoliths were then soaked in a solution of nickel nitrate and titanium tetrachloride containing 941 grams of nickel nitrate hexahydrate and 1,697 grams of a titanium solution calculated to contain 18.74 weight percent $TiO_2$. The total volume of this solution was 3500 milliliters. The soaking with gentle mixing at atmospheric temperature lasted 1 hour. The monoliths were drained, dried overnight at 120° C. and calcined overnight at 538° C.

Analysis of the final catalyst elements showed them to contain 3.1 weight percent nickel, 3.41 weight percent titanium and 7.6 weight percent molybdenum, based on the total weight of the catalytic elements. The surface area of this catalyst was 107.5 square meters per gram, with a pore volume of 0.46 cubic centimeters per gram and an average pore diameter of 171.2 A.

A slurry composed of anthracene oil and a Big Horn coal, which was sized so that 100 percent of the same passed through a 40 mesh screen, in a weight ratio of 1.5:1.0, together with hydrogen, were passed continuously upwardly through the reactor shown in the drawings at the rate of 3.52 kilograms per hour, with a weight hourly space velocity (grams of coal per hour per gram of catalyst) of 17.2. The amount of hydrogen introduced with the slurry was 1,781 cubic meters per cubic meter of slurry (10,000 standard cubic feet per barrel). The total pressure in the reactor was maintained at 3500 pounds per square inch gauge (246 kilograms per square centimeter) and the temperature therein was maintained at 413° C.

Elemental analysis of the Big Horn Coal, anthracene oil and the coal-oil slurry used are set forth below in Table I.

TABLE I

| Elemental Analysis, Per Cent By Weight (Dry Basis) | Big Horn Coal | Anthracene Oil | Slurry |
|---|---|---|---|
| Hydrogen | 5.22 | 5.97 | 5.71 |
| Nitrogen | 1.25 | 1.03 | 1.11 |
| Oxygen | 19.15 | 1.71 | 7.71 |
| Sulfur | 0.60 | 0.59 | 0.59 |
| Metals | 3.49 | None | 1.20 |

The results obtained are tabulated below in Table II.

TABLE II

| Period, Hours | 24 | 60 |
|---|---|---|
| Weight Per Cent Solvation | 80.0 | 78.6 |
| Per Cent Hydrocracking | 56.9 | 56.8 |
| Hydrogen Consumption, Pound/100 Pounds of Coal | 8.20 | 7.68 |
| Filtrate Viscosity (Cs at 100° C.) | 2.75 | 3.11 |
| Analysis of Total Liquid Product, Weight Per Cent | | |
| Hydrogen | 8.35 | 8.17 |
| Nitrogen | 0.51 | 0.62 |
| Oxygen | 1.43 | 1.35 |
| Sulfur | 0.04 | 0.13 |
| Metals | None | None |

In the above table the degree of solvation is obtained by using the following formula:

$$\text{Per Cent Coal Solvation} = \frac{100 \times \text{MAF Coal Feed} - \text{MAF Filtered Solids}}{\text{MAF Coal Feed}}$$

where MAF = moisture and ash free. Percent hydrocracking is equal to the percent of moisture and ash-free coal converted into gaseous and distillable liquids at 399° C. and three millimeters of mercury.

The data in Table II shows that hydrogenation of coal in accordance with the discovery herein results in excellent conversion of the coal to a dissolved product and excellent hydrocracking. The filtrate viscosity shows that the product obtained is relatively non-viscous or of low viscosity. Hydrogen consumption is excellent and a comparison of the data in Table II with that of Table I show that the product increased substantially in its hydrogen content but was desirably reduced in its nitrogen, oxygen, sulfur and metal content.

Obviously many modifications and variations of the invention, as hereinabove set forth, can be made without departing from the spirit and scope thereof and, therefore, only such limitations should be imposed as are indicated in the appended claims.

We claim:

1. A process for hydrogenating a feed stream containing solid components, said feed stream being selected from the group consisting of solid carbonaceous materials having the following composition on a moisture-free basis:

| | Weight Per Cent |
|---|---|
| Carbon | 45–95 |
| Hydrogen | 2.5–7.0 |
| Oxygen | 2.0–45 |
| Nitrogen | 0.75–2.5 |
| Sulfur | 0.3–10 | and liquid hydrocarbon oils having the following composition on a moisture-free, solid-free basis:

| | Weight Per Cent |
|---|---|
| Carbon | 80–95 |
| Hydrogen | 5–15 |
| Nitrogen | 0.1– 4 |
| Oxygen | 0.1– 4 |
| Sulfur | 0.1–10 | which comprises passing said feed stream, together with hydrogen, into a reactor, said reactor comprising an elongated vertical reaction vessel and elongated catalytic elements vertically disposed within said reaction vessel, said elements being composed of alumina and a hydrogenation component, said hydrogenation component being substantially distributed throughout said alumina, said alumina having a surface area of about 70 to about 150 square meters per gram, the pore size is such that at least about 60 volume percent of the pore diameters fall in the range of about 160 to about 600 A, the pore volume is in the range of about 0.4 to about 0.8 cubic centimeters per gram and the average pore diameter is in the range of about 100 to about 275 A, said catalytic elements having a thickness of about 1/32 to about ½ inch, said catalytic element being disposed within said vessel at least 1/32 inch from another of said catalytic elements and from the interior surface of said vessel, the void volume within said vessel being in the range of about 40 to about 90 percent and maintaining contact between said feed stream and hydrogen and said catalytic elements under hydrogenation conditions, whereby hydrogenation of said feed stream takes place.

2. The process of claim 1 wherein said feed stream is selected from the group consisting of solid carbonaceous materials having the following composition on a moisture-free basis:

| | Weight Per Cent |
|---|---|
| Carbon | 60–92 |
| Hydrogen | 4.0–6.0 |
| Oxygen | 3.0–25 |
| Nitrogen | 0.75–2.5 |
| Sulfur | 0.5–6.0 | and liquid hydrocarbon oils having the following composition on a moisture-free, solid-free basis:

| | Weight Per Cent |
|---|---|
| Carbon | 83–92 |
| Hydrogen | 5–13 |
| Nitrogen | 0.1– 3 |
| Oxygen | 0.1–2.5 |
| Sulfur | 0.1–5 | said alumina has a surface area of about 80 to about 125 square meters per gram, the pore diameter size is such that at least about 60 volume percent of the pores fall in the range of about 200 to about 600 A, the pore volume is in the range of about 0.45 to about 0.70 cubic centimeters per gram and the average pore diameter is in the range of about 175 to about 250 A, said catalytic elements have a thickness of about 1/16 to about ¼ inch, said catalytic elements being disposed within said vessel from about ⅛ to about 5 inches from another of said catalytic elements and from the interior surface of said vessel, the void volume within said vessel being within the range of about 50 to about 80 percent.

3. The process of claim 1 wherein said hydrogenation component is composed of nickel, titanium and molybdenum.

4. The process of claim 1 wherein said feed stream is a coal slurry composed of coal and a solvent having hydrogen transfer properties.

5. The process of claim 1 wherein said hydrogenation conditions include a temperature of about 260° to about 482° C. and a pressure of about 500 to about 10,000 pounds per square inch gauge.

6. The process of claim 1 wherein said hydrogenation conditions include a temperature of about 343° to about 468° C. and a pressure of about 1000 to about 4000 pounds per square inch gauge.

* * * * *

UNITED STATES PATENT OFFICE
CERTIFICATE OF CORRECTION

Patent No. 4,080,282    Dated March 21, 1978

Inventor(s) Donald C. Cronauer and Harold E. Swift

It is certified that error appears in the above-identified patent and that said Letters Patent are hereby corrected as shown below:

COL. 8, line 59, "17.2" should read --1.72--.

Signed and Sealed this

Eighth Day of August 1978

[SEAL]

Attest:

RUTH C. MASON
Attesting Officer

DONALD W. BANNER
Commissioner of Patents and Trademarks